United States Patent [19]

Hargis et al.

[11] Patent Number: 5,589,532

[45] Date of Patent: Dec. 31, 1996

[54] SOLVENTLESS BUTADIENE-VINYLIDENE CHLORIDE ADHESIVES CONTAINING MACROMONOMERS FOR THE BONDING OF RUBBER TO METAL

[75] Inventors: I. Glen Hargis, Tallmadge; John P. Kovalchin, Akron; Satish C. Sharma, Stow; Raymond J. Weinert, Macedonia; John A. Wilson, Akron, all of Ohio

[73] Assignee: GenCorp Inc., Fairlawn, Ohio

[21] Appl. No.: 440,586

[22] Filed: May 15, 1995

[51] Int. Cl.$^6$ .................................. C08K 3/22; C08L 9/10
[52] U.S. Cl. .................... 524/432; 524/558; 524/568; 524/571; 524/575; 525/332.7
[58] Field of Search .................................. 524/432, 568, 524/571, 558, 813; 525/332.5, 332.7

[56] References Cited

U.S. PATENT DOCUMENTS

| | | | |
|---|---|---|---|
| 4,119,587 | 10/1978 | Jazenski et al. | 524/148 |
| 4,483,962 | 11/1984 | Sadowski | 524/552 |
| 4,740,546 | 4/1988 | Masuda et al. | 524/568 |
| 4,988,753 | 1/1991 | Rullmann et al. | 524/555 |
| 4,994,519 | 2/1991 | Scheer | 524/519 |
| 5,036,122 | 7/1991 | Auerbach et al. | 524/430 |
| 5,178,675 | 1/1993 | Sexsmith | 106/13 |
| 5,200,455 | 4/1993 | Warren | 524/430 |
| 5,200,459 | 4/1993 | Weih et al. | 524/459 |
| 5,281,638 | 1/1994 | Mowrey | 524/105 |
| 5,300,555 | 4/1994 | Weih et al. | 524/571 |

FOREIGN PATENT DOCUMENTS

| | | |
|---|---|---|
| 0266879A1 | 5/1988 | European Pat. Off. . |
| 0287190A3 | 10/1988 | European Pat. Off. . |
| 0516360A1 | 12/1992 | European Pat. Off. . |
| 2223019 | 3/1990 | United Kingdom . |
| WO93/12189 | 6/1993 | WIPO . |

*Primary Examiner*—Tae Yoon
*Attorney, Agent, or Firm*—Robert F. Rywalski; Samuel B. Laferty

[57] ABSTRACT

Disclosed is a water-based adhesive with enhanced effectiveness for bonding metal and rubber substrates for uses such as vibration damping devices. The adhesive is formulated from a latex which includes at least one conjugated diene and a macromonomer containing at least two ethylene oxide repeat units.

9 Claims, No Drawings

5,589,532

SOLVENTLESS BUTADIENE-VINYLIDENE CHLORIDE ADHESIVES CONTAINING MACROMONOMERS FOR THE BONDING OF RUBBER TO METAL

FIELD OF THE INVENTION

The invention relates to a composition for bonding natural and synthetic elastomers to metallic substrates under vulcanizing conditions, which composition comprises an aqueous dispersion, containing an aromatic nitroso compound, a latex which includes an ethylene oxide macromonomer, and optionally conventional adhesion promoters, metal oxides, dispersion aids, fillers and processing aids.

BACKGROUND OF THE INVENTION

U.S. Pat. No. 4,988,753 relates to an adhesive from a mixture of vinyl chloride/vinylidene chloride/acrylic acid and polyethylene.

U.S. Pat. No. 5,036,122 teaches adhesive compositions for bonding metals to rubbers based generally on polybutadiene latex having at least one halogen from the group of chlorine, bromine, or iodine. The composition further comprises a poly-C-nitroso compound and a polymaleimide.

U.S. Pat. No. 5,200,459 teaches a poly(butadiene) latex prepared by emulsion polymerization in the presence of polyvinyl alcohol and a stabilizing solvent.

U.S. Pat. No. 5,281,638 relates to a water based adhesive having chlorosulfonated polyethylene latex as a film forming polymer.

The purpose of this invention is to create an improved water-based adhesive and a process using said adhesive to bond metal to rubber.

SUMMARY OF THE INVENTION

It is an object of the present invention to provide an improved aqueous bonding composition which has universal utility for adhesively bonding substrates such as rubber and metals. It avoids the disadvantages of solvent based adhesives e.g., flammability and the release of volatile organics during drying and curing. A macromonomer of polyethylene oxide present in the latex improves adhesive bonding. A copolymer comprising butadiene and vinylidene chloride has shown particular desirability as the copolymer of the latex.

DESCRIPTION OF THE INVENTION

A bonding composition for bonding natural and/or synthetic elastomers to metallic substrates under vulcanizing conditions, comprises an aqueous dispersion, which contains a polymer from a ethylene oxide macromonomer and at least one conjugated diene as a polymeric film-forming substance, an aromatic nitroso compound crosslinking agent and optionally a coactivator, conventional adhesion promoters, metal oxide, fillers, dispersion aids and processing aids.

The polymeric film-forming substance used in the bonding composition in accordance with the invention results in a higher bond strength between the natural and/or synthetic elastomer (rubber) and the metal substrate. An organic primer layer on said metal substrate is not needed for good adhesion.

In bond deformation tests, e.g. between rubber and metal, using a peel deformation, the failure occurs within the rubber substrate in most cases indicating that the adhesive layer and bond are stronger than the rubber and resulting in rubber being retained on the metal surface.

The ethylene oxide macromonomer desirably has a molecular weight above 200 and more desirably above 300 and comprises at least one reactive unsaturated terminal group and at least 2, more desirably at least 3 repeat units from ethylene oxide. The term macromonomer is used to define a monomer that includes within it a macromolecule such as an oligomer or polymer. Desirably the macromonomer has a number average of from 2 to 40 ethylene oxide repeat units and more desirably from 2 to 15 repeat units. The at least one reactive unsaturated terminal group includes a carbon to carbon double bond that is copolymerizable with the monomers of the latex. A preferred reactive unsaturated terminal group is derived from TMI™ (m-isopropenyl-α-α-dimethyl benzyl isocyanate). Reactive unsaturated terminal groups include vinyl, vinyl aromatic (includes TMI™), (alkyl)acrylic, allylic, and acrylic having from 3 to 20 carbon atoms more desirably from 3 to 12 carbon atoms. TMI™ is preferred due to its ease of incorporation into the macromonomer. The ethylene oxide repeat units can be present as a homooligomer or homopolymer; a block copolymer with other polyethers; random polyether copolymer wherein the polyether may include as repeat units other ether repeat units having 2 to 10 carbon atoms. The macromonomer may have two or more terminal groups. Preferably only one terminal group are unsaturated. The other terminal group or groups are desirably not unsaturated nor chemically reactive in the free radical emulsion polymerization of the latex. The examples show nonreactive groups such as octylphenoxy and nonylphenoxy. These nonreactive groups are initiator fragments from forming the polyether. Other initiator fragments may form the one or more nonreactive terminal groups.

The ethylene oxide macromonomers are desirably formed from a hydroxyl terminated oligomer or polymer having said at least 2 or at least 3 ethylene oxide repeat units which is reacted with an unsaturated compound having a group reactive by condensation mechanisms with the hydroxyl group of the oligomer or polymer. The hydroxyl terminated oligomers or polymers are commonly commercially available as emulsifiers which are made by the polymerization of cyclic ethers. The polymerization initiator or the terminating agent of polymerization can be chosen or controlled to result in one or more terminal hydroxyl groups and as many unreactive terminal groups as desired.

Unsaturated compounds having groups reactive with hydroxyl groups include TMI™ (m-isopropenyl-α-α-dimethyl benzyl isocyanate), isocyanatoethyl methacrylate and other isocyanates having unsaturation also having from 3 to 20 carbon atoms, epoxy acrylates and methacrylates having from 5 to 20 carbon atoms, acrylic acids and alkyl derivatives thereof having from 3 to 20 carbon atoms, and dicarboxylic acids or their anhydrides having from 4 to 20 carbon atoms.

Also contemplated is where a hydroxyl or amine terminated oligomer having 2 or more ethylene oxide repeat units is reacted with a diisocyanate having from 3 to 25 carbon atoms forming an isocyanate terminated oligomer with 2 or more ethylene oxide repeat units. That isocyanate terminated oligomer can then be reacted with hydroxy alkyl esters of (alkyl)acrylic acids having from 5 to 15 carbon atoms to form macromonomers. Alternatively the hydroxy alkyl esters of alkyl(acrylic acids), such as 2-hydroxyethylacrylate, may be reacted first with the diisocyanate and that reaction product reacted with the hydroxyl or amine terminated oligomer with 2 or more ethylene oxide repeat units to form a macromonomer.

Isocyanate groups react with hydroxyls to form urethane linkages, epoxy groups react with hydroxyls to form ether linkages, and carboxylic acid groups react with hydroxyls to form ester linkages. When bonds are formed by an esterification condensation mechanism the use of catalysts (e.g. triphenylphosphonium bromide and tetrabutyltitanate), higher temperatures (e.g. from about 50° to about 150° C.) or the removal of esterification by-products may increase reaction rates or yields.

When forming the macromonomers from hydroxyl group containing monomers, desirably the hydroxyl groups are present in equivalent amounts to the groups reactive with them but either reactant may be present in excess because some macromonomer is still formed. It is preferable to have excess hydroxyl groups rather than excess of the unsaturated compounds having groups reactive with the hydroxyl groups. Desirable ratios of the reactive groups are from about 0.5:1 to about 1.5:1 and more desirably from about 0.9:1 to about 1:0.9.

The ethylene oxide macromonomers are desirably used in the latex in amounts from about 0.5 to about 20 wt. % based on the total of all monomers in the latex, more desirably from about 0.7 to about 15 wt. %, and preferably from about 1 to about 10 wt. %. These amounts may also be expressed as wt. % of repeat units from these macromonomers in the final latex.

The ethylene oxide macromonomers appear to result in enhanced adhesion of the adhesive to both the metal and rubber substrates. These adhesives perform significantly better because the ethylene oxide repeat units are in a macromonomer form that can copolymerize with the diene monomers used to form the latex. In most adhesive applications wetting is an essential step in forming a bond. After wetting occurs at the interface then interdiffusion or interaction of the materials to form a bond can occur. Facilitating wetting usually results in better bond strength.

The remainder of the latex is formed from common emulsion polymerized monomers. These monomers generally have molecular weights much lower than the at least 200 or 300 molecular weight anticipated for the macromonomer. In that the macromonomer does copolymerize it may be considered as a monomer. Desirably at least 30 wt. % of the monomers are at least one conjugated diene monomer having from 4 to 12 carbon atoms. More desirably the at least one conjugated diene monomer is from about 30 to about 99.5 wt. %, preferably from about 40 to about 95 wt. %, and most preferably from about 50 to about 94 wt. % of the total monomers in the latex. The diene repeat units are postulated to improve wetting and interpenetration of the adhesive with the rubber substrate.

Desirably the latex monomers include at least 5 wt. %, and more desirably from about 5 to about 60 wt. % of vinylidene chloride based on all the monomers of the latex. The vinylidene chloride being more polar than the conjugated dienes is believed to enhance wetting and adhesion to the metal substrate. Additional monomers of vinyl aromatics having from 6 to 12 carbon atoms, and ethylenically unsaturated monomers having one or more heteroatoms of oxygen and/or nitrogen and from 3 to 12 carbon atoms may be present in the latex in small amounts such as desirably less than about 10, 15, or 20 wt. % based on the total monomers. Such monomers are shown in the seed latex in the example (styrene and itaconic acid). Incorporated by reference are U.S. Pat. Nos. 4,483,962 and 5,200,459 for their teachings of other monomers that can be included in latex polymers. The above recited monomer percentages may be expressed as percentages of repeat units from these monomers in the final latex.

The latex can be made from a seeded polymerization where the seed latex is formed first and then swollen with additional monomers which are polymerized into the final latex. Although the latex can be any solids content achievable without coagulation the commercially desirable concentrations are from about 30 to 60 wt. % solids. Emulsifiers are used in the polymerization to stabilize the particles against coagulation. Their amount and specific type may vary within ranges well known to the art. Initiators are used to initiate the polymerization of monomers to polymers. The specific initiators chosen and the amounts thereof depend on the polymerization temperature chosen.

The poly-carbon-nitroso compound (nitrosamine crosslinking agent) functions to chemically crosslink the latex polymer with itself and to the rubber during the bonding process. The nitroso compound may be replaced with the corresponding oxime or corresponding nitro compound with the appropriate oxidation/reduction agent (vulcanization accelerators serve as oxidants and barium oxide is an effective reducing agent). Suitable nitroso compounds include poly(p-dinitrosobenzene) and other compounds having one or more aromatic nuclei (such as benzene, naphthalenes, anthracenes, biphenyl and the like), to which two or more nitroso groups are bonded to non-adjacent ring carbon atoms.

The nuclear hydrogen atoms of the aromatic nucleus can be replaced by alkyl, alkoxy, cycloalkyl, aryl, aralkyl, alkaryl, arylamine, arylnitroso, amino, halogen, and like groups. The presence of such substituents on the aromatic nuclei has little effect on the activity of the nitroso compounds in the present invention. As far as is presently known, there is no limitation as to the character of the substituent, and such substituents can be organic or inorganic in nature. Thus, where reference is made herein to a nitroso compound, it will be understood to include both substituted and unsubstituted nitroso compounds, unless otherwise specified.

Particularly preferred nitroso compounds are characterized by the formula:

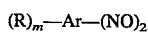

$(R)_m-Ar-(NO)_2$ wherein Ar is selected from the group consisting of phenylene and naphthalene; R is a monovalent organic radical selected from the group consisting of alkyl, cycloalkyl, aryl, aralkyl, alkaryl, arylamine, and alkoxy radicals having from 1 to 20 carbon atoms, amino, or halogen, and is preferably an alkyl group having from 1 to 8 carbon atoms; and m is zero, 1, 2, 3, and 4, and preferably is zero.

Examples of suitable compounds are: m-dinitrosobenzene, p-dinitrosobenzene, m-dinitrosonaphthalene, p-dinitrosonaphthalene ,2,5-dinitroso-p-cymene, 2-methyl-1,4-dinitrosobenzene, 2-methyl-5-chloro-1,4-dinitrosobenzene, 2-fluoro-1,4-dinitrosobenzene, 2-methoxy-1,3-dinitrosobenzene, 5-chloro-1,3-dinitrosobenzene, 2-methoxy-1,3dinitrosobenzene, 2-benzyl-1,4-dinitrosobenzene and 2-cyclohexyl-1,4-dinitrosobenzene.

The use of poly(p-dinitrosobenzene) (PDNB) or poly(1, 4-dinitrosonaphthalene) is preferred in bonding composition in accordance with the invention. The desired amounts of the nitroso amine crosslinking agent is from about 50 to about 150 parts on a dry wt. basis per 100 parts of the latex on a dry wt. basis. PDNB was used in the examples as a 50% dispersion in water.

The adhesive desirably includes a co-activator for cure such as a polymaleimide compound. The polymaleimide compound may be an aliphatic or aromatic polymaleimide and must contain at least two maleimide groups. Aromatic polymaleimides having from about 2 to 100 aromatic nuclei wherein no more than one maleimide group is directly attached to each adjacent aromatic ring are preferred. Particularly preferred aromatic polymaleimide compounds have the formula:

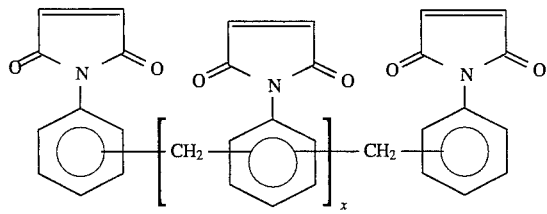

wherein x is from about 0 to 100. Such polymaleimides are common materials of commerce and are sold under different trade names by different companies, such as BMI-M-20 and BMI-S polymaleimides supplied by Mitsui Toatsu Fine Chemicals, Incorporated.

These co-activators are used to improve the crosslinking of the latex polymer and result in higher bond strength between the latex polymer and the rubber substrate. A preferred compound is 1,1-(methylenedi-4-1-phenylene bis-maleimide. The co-activator is desirably used in amounts from 0 to 200 parts by weight (dry basis) per 100 parts by weight (dry basis) of the latex. U.S. Pat. No. 5,036,122 is hereby incorporated by reference for its teachings on nitroso crosslinking agents and co-activators.

The bonding composition in accordance with the invention, may also contain conventional additives such as organo silanes, dispersing agents, adhesion promoting resins such as phenol formaldehyde, carbon black, silica, calcium carbonate, oxides of the metals Al, Ca, Zn, Mg, Pb, Zr, also zirconium salts, e.g. zirconium aluminate, and lead salts of inorganic and/or organic acids, e.g. basic lead carbonate.

Dispersing agents are used to form stable dispersions from the particulate components. They include addition products of alkylphenols, such as nonylphenol, and ethylene oxide, fatty alcohol or a fatty alcohol partial ester of phosphoric acid. The dispersion may additionally be stabilized with polyvinylalcohol or Polywet™ such as Polywet Z-1766 a sodium salt of a polyfunctional oligomer or water-soluble colloids, such as methylcellulose, methylhydroxylpropylcellulose or hydroxyethylcellulose. As previously recited the use of poly (vinyl alcohol) is discouraged in these formulations.

It is desirable to add small amounts of benzoquinone to inhibit premature crosslinking or gelling of the adhesive. The benzoquinone or an equivalent thereto is desirably used in amounts from about 0.05 to about 1.5 parts by weight and preferably from about 0.1 to about 1.0 parts by weight based on 100 parts by weight to the latex on a dry basis.

Organic solvents and/or coalescing solvents may be used in minor amounts in the adhesive, which should not exceed 5, 10, or 15 weight percent and are desirably not present. Organic solvents which are included in these weight percents are those that volatilize in 1 hour at 150° C. at atmospheric pressure.

The adhesive composition in accordance with the invention may be used to bond natural rubber, synthetic rubber or combinations thereof (also known as elastomers) to a metal substrate under vulcanizing conditions. The rubber may be in either the crosslinked or non-crosslinked form. Examples of synthetic rubbers include polychloroprene rubber, styrene-butadiene rubber, butadiene rubber polyisoprene, poly-(octenamer), nitrile rubber, rubber comprising an ethylene-propylene copolymer or an ethylene-propylene-diene terpolymer. The rubber is mixed with fillers, oils, curatives etc. as is well known to the art. Table IX shows a formulation used for testing purposes. The rubber substrate may be used as a crosslinked shaped article or as an uncured composition that is shaped and crosslinked contemporaneously with the adhesive bonding.

The substrate may consist of metallic materials, such as steel, stainless steel, which may have been surface-treated, e.g. phosphatized or galvanized. The metal substrate may also be iron, aluminum, copper, brass, bronze, nickel, zinc and their alloys. A preferred substrate is steel which has the substrate surface grit blasted. Another preferred substrate is steel which has a phosphate conversion layer or coating (i.e., phosphate-based corrosion inhibitor coatings, phosphatized). These phosphate coatings can be organic or inorganic. Phenolic and other organic primers can be used but are not necessary for adhesion. The adhesive will also bond two or more metal substrates.

Some nonmetallic materials, such as molding compositions comprising phenolic resin or polyester resin and/or urethanes which may include woven fabrics, nonwoven, or chopped fiber of natural or synthetic origin (e.g. glass) may be adhered.

The adhesive compositions of the present invention may be prepared by any method known in the art, but are preferably prepared by combining and milling the ingredients and water in a ball-mill, sand-mill, ceramic bead-mill, steel bead-mill, high speed media-mill, or the like.

The bonding composition in accordance with the invention desirably contains between 12 and 50 percent by weight solids and desirably has a viscosity of about 10 to 1000 centipoise (Pa.s) for ease of application and can be applied to the substrate or rubber surfaces by conventional methods, such as brushing, spraying, roll-coated and dipping. One or more surface areas of the metal substrate and/or rubber which are going to be bonded by the adhesive are the interfacial bond areas. One substrate surface (either metal or rubber), or optionally both, are covered by an adhesive layer. Multiple coatings or layers may be used. After the coating has been applied and the water at least partially evaporated, the surfaces of the interfacial bond areas of the substrates are contacted with each other and the bond is formed under vulcanizing conditions which includes the application of heat to at least the adhesive layer and may include the application of pressure. The temperature activating the cure of the adhesive is desirably from about 120° C. to about 200° C. and more desirably from about 140° C. to about 180° C. Depending on the temperature the bond is desirably formed in from about 3 to about 60 minutes.

The advantages afforded by the adhesive composition in accordance with the invention are that it can be prepared in a simple manner, has a long shelf-life, and does not require an organic primer layer on the metal substrate. The lack of a primer saves time. The adhesive has a universal utility for bonding of rubbers to metals or metals to metals or rubbers to rubbers. It can be used with specialty types of rubber and various substrate materials. The resulting bond has a high resistance to corrosion, to elevated temperatures, and to boiling water and glycols. Being water-based, it has low or near zero volatile organic emissions during drying (desirably less than 1.0, 0.5, 0.1, or 0.05 wt. % volatile organics as defined above for organic solvents in said adhesive composition). The laminates are useful as components in vehicle vibration control products that have elastomer to metal interfaces.

1. Substrates

In the following examples the rubber compound of Table IX is a formulation suitable for use in automotive engine mount applications. It is cured for about 10 minutes at 160° C. Typically after curing it has a Shore A hardness of 58. The metal substrates were cold rolled steel coupons (1"×2.5" equiv. to 2.5×6.4" cm) treated with calcium modified zinc phosphate coating.

2. Latexes

The ethylene oxide macromonomer was first prepared in Example 1. In Example 2 a latex that was prepared was subsequently used as a seed latex in forming latexes of Examples 3–6. The latex of Example 7 was formed without a seed latex.

3. Adhesive Composition

The adhesives are aqueous dispersions of a copolymer of butadiene and vinylidene chloride, an effective amount of aromatic polynitroso compound, an effective amount of coactivator, zinc oxide and fillers. The adhesive compositions of Tables X–XIII contain the latexes of Tables III–VII.

Zinc oxide may participate in ionic bond formation with the carboxylic groups of the latex. The resulting ionic domains may enhance mechanical strength.

To form a more stable dispersion, the water-based adhesive contains an anionic dispersant, Polywet™ Z1766 (sodium salt of a polyfunctional oligomer, supplied by Uniroyal Chemical Co.), and a nonionic dispersing agent, Natrosol® 250LR (hydroxyethyl cellulose supplied by Aqualon Corp.).

Preparation of the Adhesive a. Deionized water (220 g) was placed in ball mill jar, followed by Natrosol™ 250LR (2.0g), Polywet™ Z 1766 (2.0g), Benzoquinone (0.2 g) and HVA-2 (1,1'-(methylene-di-4,1-phenylene) bismaleimide, supplied by DuPont Chemical Co.) (9.2 g).

b. Aqueous dispersions of 37.5 g AquaBlack® (40 weight percent), 17 g Zeeox® (50 percent zinc oxide in water) and 51 g PDNB (poly (para-dinitrobenzene) 50 percent paste in water supplied by MLPC International) were added to the materials of above. The ball mill jar was rotated for 5 hours. The resulting dispersion was a finely divided black dispersion, designated as the curative masterbatch.

c. A 36 g aliquot of the curative masterbatch was added to a clean container with a stirring bar, then 7.4 g dry basis of a latex of Tables III–VII was slowly added while stirring. The final adhesive composition contains 25 weight percent solids and 75 weight percent water.

4. Applying the Adhesive

Because the adhesive contains dispersed solids in water, it is necessary to adequately agitate the mixture prior to use. The adhesive compositions were applied to phosphated metals by brush, an air gun, or an airless spray gun. To decrease drying time, the metals may be preheated to 60° C. Dried film thicknesses were from 0.5 mil to 1 mil (0.013 to 0.025 mm).

5. Curing of Rubber and Adhesive

The metals coated with the adhesives and uncured NR substrate of Table I are brought together and compression molded at 20,000 lbs. (44,000 kg) ram force spread over six test specimens of dimensions 1"×2.5" (2.5×6.4 cm) and heated for 10 minutes at 160° C.

6. Testing

Adhesion testing was carried out at room temperature with an Instron Tester. Compression molded rubber-to-metal parts were peeled at a rate of 2 inches/minute at a 90° peel angle, according to ASTM D429, Method B for uncured rubber. The maximum peel force and the percent rubber retained on a one square inch surface were recorded as the mean of three specimen per sample.

EXAMPLE 1

Liquid monohydroxyl-end functionalized ethoxylated materials from Rhone-Poulenc (Igepal®) (alkylphenoxy-poly(ethylenoxy)ethanol) were reacted with m-isopropenyl-$\alpha,\alpha$-dimethyl benzyl isocyanate (TMI® Cytec) in the presence of a stannous octoate catalyst at a temperature of 65° to 100° C. The amount of hydroxyl groups of the ethoxylated polymeric species was kept in excess of the isocyanate groups (approximate stoichiometry of 111 to 105%) and the extent of the reaction was monitored by infrared (IR) spectroscopy. When IR spectroscopy indicated no free isocyanate was present, the samples were poured into a container for storage. The resulting macromonomer is terminated at one end with an $\alpha$-methylstyrene functional group. The carbon-carbon double bond of this macromonomer is amenable to free radical emulsion polymerization. The other end of the macromonomer is either an octylphenoxy or nonylphenoxy group.

TABLE I

| Macro-monomer | Ethylene Oxide Designation | Wt. % Ethylene Oxide in Igepal | Pretreatment of Ethylene Oxide |
|---|---|---|---|
| I-A | Igepal CA 210 | 23 | used as received |
| I-B | Igepal CA 520 | 44 | used as received |
| I-C | Igepal CO 897 | 89 | dried at reduced pressure |
| I-D | Igepal CA 881 | 86 | dried at reduced pressure |
| I-E | Igepal CA 630 | 65 | used as received |

CA denotes octylphenoxypoly(ethyleneoxy)ethanol
CO denotes nonylphenoxypoly(ethyleneoxy)ethanol

EXAMPLE 2

In this example a seed latex is prepared in two steps from styrene and itaconic acid for use in subsequent latex formulations. The reaction went essential to 100% conversion without any coagulum. The amount of water used is not listed but as seen in the solids determination it is about 91 wt. % of the latex. PPHM is parts by weight per one hundred parts of polymerizable monomers in the recipe.

TABLE II

| PREPARATION OF SEED LATEX | |
|---|---|
| Components | PPHM |
| Step 1: (2 hours at 65° C.) | |
| Itaconic Acid | 30.1 |
| Hampene ™ Na3T | 1.0 |
| Dowfax ™ 2A1 | 2.8 |
| Monawet ™ MB-45 | 20.1 |
| Styrene | 69.9 |
| Ammonium Persulfate | 6.0 |
| Solids (%) | 9.1 |
| Step 2: (1 hour at 65° C.) | |
| Disodium Phosphate | 4.0 |
| Solids (%) | 8.8 |

*Dowfax ™ 2A1 is sodium diphenyloxide sulfonate (15% active)
Monowet ™ MB-45 is dibutyl sodium sulfosuccinate (45% active)
Hampene ™ Na3T is ethylenediaminetetraacetic acid, trisodium salt trihydrate (40% active) a sequestering agent.

EXAMPLE 3

Preparation of Latexes with and without Unfunctionalized Igepal CA 210 or CA 520

Butadiene-vinylidene chloride latexes were prepared having high conversion of monomers to polymer and low coagulum levels using the latex of Example 2 as a seed. The polymerizations were performed in two steps. The first step was polymerization for approximately 22 hours at 65° C. The second step was further polymerization to the point of reduced pressure (i.e. vacuum). The latexes were cooled and their properties determined. These latexes serve as control material.

TABLE III

| Control Latexes | 3-A | 3-B | 3-C | 3-D | 3-E | 3-F |
|---|---|---|---|---|---|---|
| Step 1: | | | | | | |
| Seed Latex Example 2 | 6.8g* | 6.8g* | 6.8g* | 6.8g* | 6.8g* | 6.8g* |
| Igepal ™ CA 210 | 1.2 | 2.5 | 0 | 0 | 0 | 0 |
| Igepal ™ CA 520 | 0 | 0 | 0 | 1.2 | 2.5 | 4.2 |
| Vinylidene Chloride | 10.0 | 10.0 | 10.0 | 10.0 | 10.0 | 10.0 |
| Sulfole 120 | 1.6 | 1.6 | 1.6 | 1.6 | 1.6 | 1.6 |
| Ammonium Persulfate | 0.3 | 0.3 | 0.3 | 0.3 | 0.3 | 0.3 |
| Butadiene | 90.1 | 90.1 | 90.1 | 90.1 | 90.1 | 90.1 |
| Step 2: | | | | | | |
| Ammonium Persulfate | 0.3 | 0.3 | 0.3 | 0.3 | 0.3 | 0.3 |
| Total Solids Content (%) | 37.0 | 37.1 | 36.4 | 33.2 | 36.7 | 37.1 |

*Dry basis
Sulfole 120 is tertiary dodecyl mercaptan (a chain transfer agent).

EXAMPLE 4

Polymerization of Latexes with Functionalized Igepal CA 210 or CA 520

Latexes from butadiene-vinylidene chloride and a macromonomer were polymerized using the latex of Example 2 as a seed and the macromonomers 1A or 1B (derived from Igepal CA 210 or CA 520 respectively). The reactions were performed in two steps as previously outlined.

TABLE IV

| Latexes | 4-A | 4-B | 4-C | 5-D | 4-E |
|---|---|---|---|---|---|
| Step 1: | | | | | |
| Seed Latex Example 2 | 6.8*g | 6.8*g | 6.8*g | 6.8*g | 6.8*g |
| Macromonomer 1-A | 1.2 | 2.5 | 0 | 0 | 0 |
| Macromonomer 1-B | 0 | 0 | 1.2 | 2.5 | 4.2 |
| Vinylidene Chloride | 10.0 | 10.0 | 10.0 | 10.0 | 10.0 |
| Sulfole 120 | 1.6 | 1.6 | 1.6 | 1.6 | 1.6 |
| Ammonium Persulfate | 0.3 | 0.3 | 0.3 | 0.3 | 0.3 |
| Butadiene | 90.1 | 90.1 | 90.1 | 90.1 | 90.1 |
| Step 2: | | | | | |
| Ammonium Persulfate | 0.3 | 0.3 | 0.3 | 0.3 | 0.3 |
| Total Solids Content (%) | 37.2 | 37.5 | 37.3 | 37.4 | 37.9 |

*Dry basis

EXAMPLE 5

Polymerization of Latexes with a Blend of Functionalized Igepal CA 210 and Functionalized CA 520

A latex from butadiene-vinylidene chloride and a blend of macromonomers was polymerized as previously outlined using Example 2 as a seed latex. A blend of macromonomers (1-A and 1-B) from Igepal CA 210 and Igepal CA 520 from Example 1 was used.

TABLE V

| Latex | 5A |
|---|---|
| Step 1: | |
| Latex Example 2 | 6.8*g |
| Macromonomer 1-A | 1.2 |
| Macromonomer 1-B | 1.2 |
| Vinylidene chloride | 10.0 |
| Sulfole 120 | 1.6 |
| Ammonium Persulfate | 0.3 |
| Butadiene | 90.1 |
| Step 2: | |
| Ammonium Persulfate | 0.3 |
| Total Solids Content (%) | 37.6 |

*Dry Basis

EXAMPLE 6

Polymerization of Latexes with Functionalized Igepal CA 881 or Igepal CA 630

Butadiene-vinylidene chloride latexes as were prepared as outlined above using macromonomers 1-D and 1-E as prepared in Example 1 from Igepal CA 881 or CA respectively.

TABLE VI

| Latexes | 6A | 6B |
|---|---|---|
| Step 1: | | |
| Latex Example 2 | 6.8*g | 6.8*g |
| Macromonomer 1-D | 2.5 | 0.0 |
| Macromonomer 1-E | 0.0 | 2.5 |
| Vinylidene Chloride | 10.0 | 10.0 |
| Sulfole 120 | 1.6 | 1.6 |
| Ammonium Persulfate | 0.3 | 0.3 |
| Butadiene | 90.1 | 90.1 |
| Step 2: | | |
| Ammonium Persulfate | 0.3 | 0.3 |
| Total Solids Content (%) | 33.4 | 37.3 |

*Dry Basis

EXAMPLE 7

Polymerization of Latex with Functionalized Igepal CO 897 and without a Seed

A butadiene-vinylidene chloride latex was polymerized to high conversion and low coagulum level without any seed using macromonomer 1-C from Igepal CO 897. The reaction was performed in two steps. The first step was run for approximately 22 hours at 65° C. The second step was then run to the point of reduced pressure (i.e. vacuum). The latex was cooled and its properties determined.

TABLE VII

| Latex | 7A |
|---|---|
| Step 1: | |
| Macromonomer 1-C | 2.5g |
| Vinylidene Chloride | 10.0 |
| Sulfole 120 | 1.6 |
| Ammonium Persulfate | 0.3 |
| Butadiene | 90.1 |
| Step 2: | |
| Ammonium Persulfate | 0.3 |
| Coagulum (%) | 0.6 |
| Total Solids Content (%) | 37.6 |

EXAMPLE 8

Adhesive Preparation

Adhesives were prepared using the formulation given below. The latex denotes the latexes from Examples 3 to 7. The final solids content is about 25 wt. %.

TABLE VIII

ADHESIVE FORMULATION

| Component | Formulation Wt % Dry Basis | Description | Supplier |
|---|---|---|---|
| Natrosol 250LR | 1.5 | hydroxyethyl cellulose | Aqualon Corp. |
| Benzoquinone | 0.2 | | |
| Polywet Z-1766 | 1.5 | sodium salt of a polyfunctional oligomer | Uniroyal Chemical Co. |
| Phenylene bis-maleimide | 7.0 | | |
| Poly p-Dinitroso Benzene | 19.3 | 50% paste in water | MLPC International |
| Aqua Black | 11.4 | 40% dispersion in water | Bordon Packaging and Industrial Products |
| Zinc Oxide | 6.4 | 50% dispersion in water | Zee Chem Inc. |
| Latex (dry) | 52.7 | | |

% Solids of Adhesive: 25%

EXAMPLE 9

TABLE IX

NATURAL RUBBER FORMULATION

| Material | phr |
|---|---|
| Natural Rubber, SMR-GP | 100.0 |
| Carbon Black, N550 | 42.0 |
| Carbon Black, N990 | 10.0 |
| Naphthenic Oil | 6.0 |
| Zinc Oxide | 5.0 |
| Stearic Acid | 2.0 |
| Santoflex ™ 13 N-1,3-Dimethylbutyl-N'-phenyl-p-phenylenediamine | 0.5 |
| PVI N-(cyclohexylthio)phthalamide | 0.2 |
| MBT ™ 2-mercaptobenzothiazole | 0.3 |
| MBTS ™ Benzothiazyl disulfide | 0.3 |
| CBS ™ N-cyclohexyl-2-benzothiazyl-sulfenamide | 0.4 |
| Sulfur | 3.0 |

EXAMPLE 10

Comparison of Freshly Prepared Laminated Samples

This example illustrates the superior performance of latex including the macromonomer from Igepal CA 210 therein (Latexes 4A and 4B) in the adhesive when compared to those of the corresponding latexes with unfunctionalized versions of Igepal CA 210 (Control Latexes 3-A and 3-B) or without any macromonomers (Control Latex 3C).

This example also illustrates the superior performance of a latex using the macromonomer from Igepal CA 520 (Latexes 4C, 4D, and 4E) when compared to the material without a macromonomer (Control Latex 3C) and those containing the unfunctionalized version of Igepal CA 520 (Control Latexes 3D, 3E and 3F).

TABLE X

ADHESION (90° T-PEEL) OF CURED NATURAL RUBBER TO SAND BLASTED STEEL

| Latex | Max. Load kg/cm and (pli) | Rubber Tear* (%) |
|---|---|---|
| Control 3-A (CA 210) | 12.1 (68) | 20 |
| Control 3-B (CA 210) | 4.8 (27) | 10 |
| Control 3-C | 4.5 (25) | 10 |
| Control 3-D (CA 520) | 10.7 (60) | 20 |
| Control 3-E (CA 520) | 7.3 (41) | 23 |
| Control 3-F (CA 520) | 13.9 (78) | 70 |
| 4-A (CA 210) | 19.6 (110) | 90 |
| 4-B (CA 210) | 23.0 (129) | 100 |
| 4-C (CA 520) | 20.2 (113) | 90 |
| 4-D (CA 520) | 22.5 (126) | 100 |
| 4-E (CA 520) | 16.1 (90) | 60 |

*High amounts of rubber tear indicate the adhesive is stronger than the rubber substrate.

EXAMPLE 11

Comparison of the Performance after Aging

This example illustrates the superior long-term performance of the water based adhesives containing macromonomer modified latexes (Latexes 4C and 4E) using a macromonomer from Igepal CA 520 when compared to adhesives from latexes with the corresponding unfunctionalized version of Igepal CA 520 (Latexes 3D and 3F).

TABLE XI

ADHESION (90° T-PEEL) OF CURED
NATURAL RUBBER TO SAND BLASTED STEEL

| Latex | Max. Load kg/cm and (pli) | Rubber Tear (%) | Days Aged |
|---|---|---|---|
| 4-C Macromonomer 1B | 20.2(113) | 90 | 0 |
| | 17.7 (99) | 90 | 6 |
| 4-E Macromonomer 1B | 16.1 (90) | 60 | 0 |
| | 20.9(117) | 100 | 1 |
| | 17.1 (96) | 100 | 7 |
| | 14.6 (82) | 90 | 10 |
| (Control) 3-D | 10.7 (60) | 20 | 0 |
| | 13.9 (78) | 50 | 7 |
| (Control) 3-F | 13.9 (78) | 70 | 0 |
| | 7.5 (42) | 10 | 6 |
| | 10.9 (61) | 50 | 11 |

EXAMPLE 12

Comparison of the Bond Strength for a Latex with Mixed Functionalized Igepal Macromonomers This example illustrates the performance of latex containing mixed macromonomers (Latex 5A) using macromonomers from Igepal CA 210 and CA 520. The resulting adhesive was superior to the adhesive containing no macromonomer (Latex 3C).

TABLE XII

ADHESION (90° T-PEEL) OF CURED
NATURAL RUBBER TO SAND BLASTED STEEL

| Latex | Max. Load kg/cm and (pli) | Rubber Tear (%) |
|---|---|---|
| 5A | 16.4(92) | 90 |
| (Control) 3C | 4.5(25) | 10 |

EXAMPLE 13

Bonding of Uncured Rubber to Zinc Phosphated Steel

This example illustrates the performance of a latex containing a macromonomer (Example 6B using a macromonomer from Igepal CA 630) for bonding natural rubber to zinc phosphated steel.

TABLE XIII

| Latex | Max. Load kg/cm and (pli) | Rubber Tear (%) |
|---|---|---|
| 6-C | 19.6 (110) | 95 |

While in accordance with the patent statutes the best mode and preferred embodiment has been set forth, the scope of the invention is not limited thereto, but rather by the scope of the attached claims.

What is claimed is:

1. An adhesive composition, comprising:
   a latex and a nitrosamine crosslinking agent or a precursor thereto said precursor comprising an oxime with an oxidant or a nitro compound with a reductant, said latex comprising:
   the emulsion polymerization product from at least two unsaturated monomers wherein said unsaturated monomers comprise at least a conjugated diene having from 4 to 12 carbon atoms and at least an ethylene oxide macromonomer, wherein said ethylene oxide macromonomer comprises an unsaturated terminal group and from 2 to 40 ethylene oxide repeat units.

2. An adhesive according to claim 1, wherein said ethylene oxide macromonomer is from about 0.5 to about 20 weight percent of the unsaturated monomers polymerized in said latex.

3. An adhesive according to claim 2, wherein at least 30 weight percent of said unsaturated monomers are said at least one conjugated diene having from 4 to 12 carbon atoms.

4. An adhesive according to claim 3, wherein said unsaturated monomers further comprise at least 5 weight percent vinylidene chloride.

5. An adhesive according to claim 3, further including a bismaleimide compound and zinc oxide.

6. An adhesive according to claim 4, further including a bismaleimide compound and zinc oxide.

7. An adhesive according to claim 6, wherein said ethylene oxide macromonomer is from about 1 to about 10 weight percent of said unsaturated monomers.

8. An adhesive according to claim 7, wherein the unsaturated terminal group of said ethylene oxide macromonomer is an ethylenically unsaturated group.

9. An adhesive according to claim 7, wherein the unsaturated terminal group of said ethylene oxide macromonomer is a vinyl aromatic group or an acrylic group.

* * * * *